(No Model.) 2 Sheets—Sheet 1.
A. H. WHEELER.
COMBINED BRAKE AND FENDER.
No. 588,255. Patented Aug. 17, 1897.
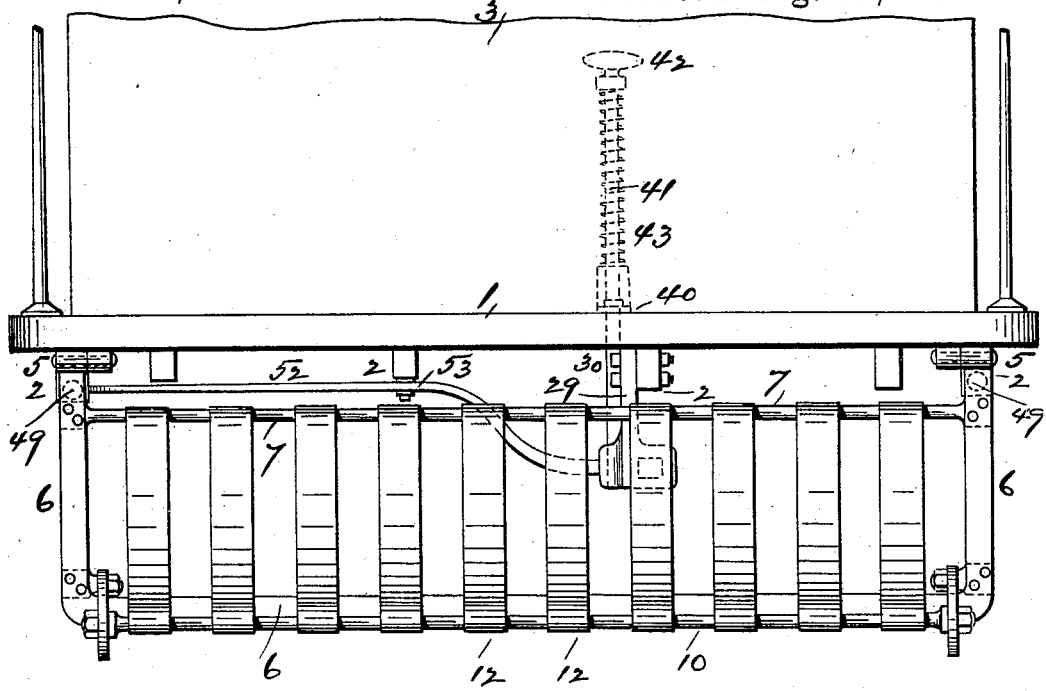
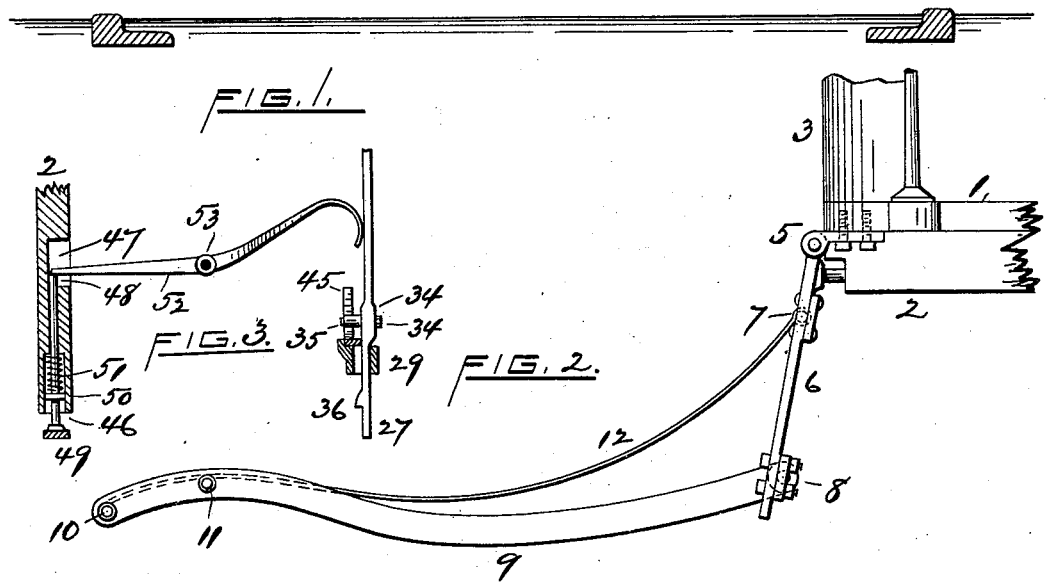
WITNESSES.  
Charles T. Hannigan  
Daniel W. Fink  
INVENTOR.  
Albert H. Wheeler  
by Warren R. Perce  
Atty.

(No Model.) 2 Sheets—Sheet 2.
A. H. WHEELER.
COMBINED BRAKE AND FENDER.
No. 588,255. Patented Aug. 17, 1897.
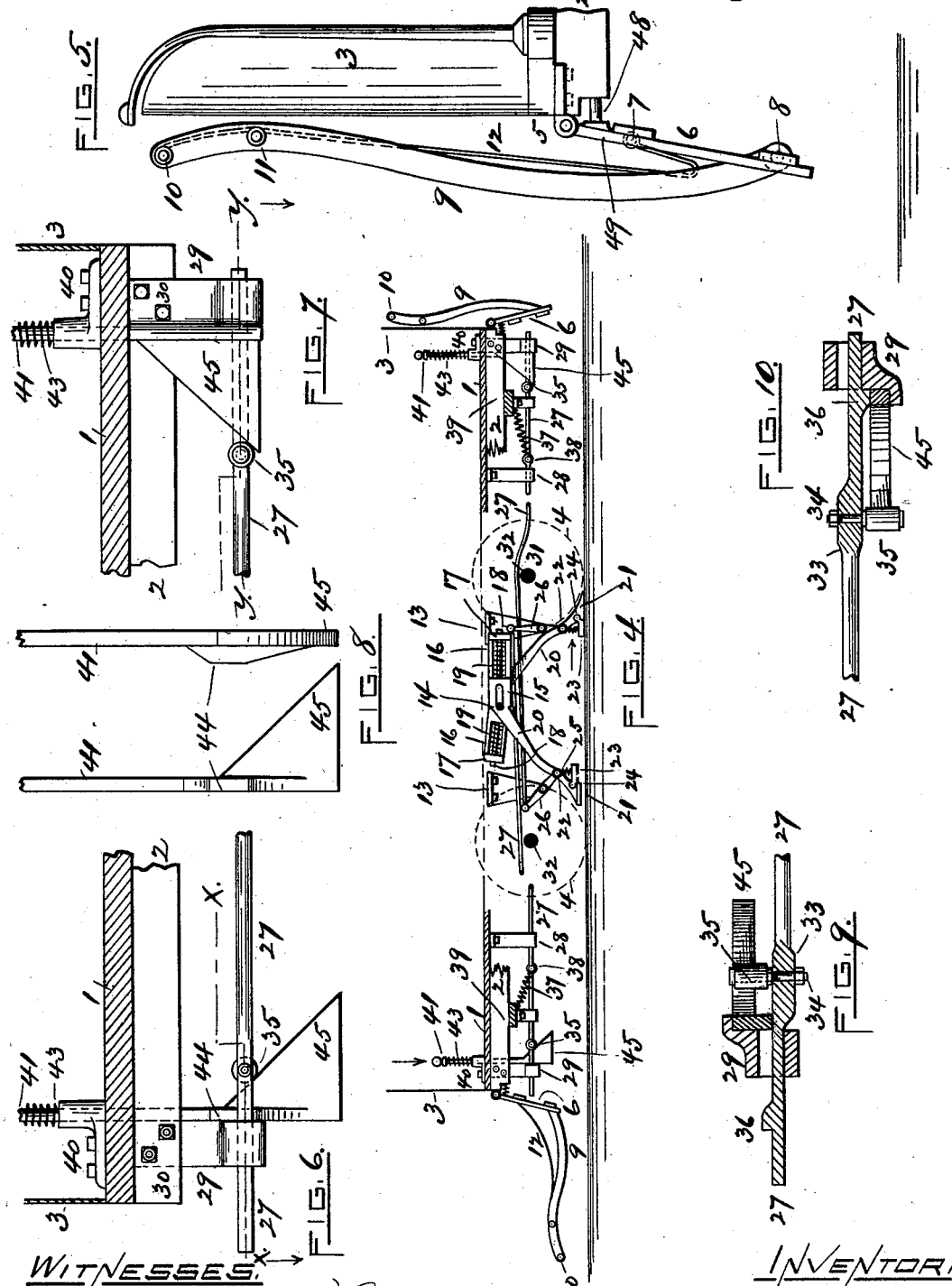
WITNESSES: INVENTOR:
Charles T. Hannigan Albert H. Wheeler
Daniel W. Fink By Warren R. Perce
Atty

UNITED STATES PATENT OFFICE.

ALBERT H. WHEELER, OF WARWICK, RHODE ISLAND, ASSIGNOR OF ONE-HALF TO EDWARD PIKE, OF SAME PLACE.

COMBINED BRAKE AND FENDER.

SPECIFICATION forming part of Letters Patent No. 588,255, dated August 17, 1897.

Application filed February 12, 1897. Serial No. 623,117. (No model.)

*To all whom it may concern:*

Be it known that I, ALBERT H. WHEELER, of the town of Warwick, in the county of Kent, in the State of Rhode Island, have invented a certain new and useful Improvement in a Combined Fender and Brake for Electric and other Cars; and I declare the following to be a specification thereof, reference being had to the accompanying drawings.

Figure 1 is a front elevation of my improved car-fender. Fig. 2 is a side elevation of the same. Fig. 3 is a top plan view of the latch-rod which moves the shoe-brake and of the spring-actuated lever and buffer in connection therewith. Fig. 4 is a side elevation of the fenders and brakes and the mechanism to operate the same. Fig. 5 shows in side elevation the fender when folded up against the dashboard of the car. Figs. 6 and 7 show in two positions in side elevation the latch-rod and the presser-rod by which the motorman can operate the latch-rod. Fig. 8 shows the presser-bar in side elevation and front elevation. Fig. 9 is a view of the latch-rod and presser-rod as seen on line $x$ $x$ of Fig. 6. Fig. 10 is a view on line $y$ $y$ of Fig. 7.

Like numerals indicate like parts.

My invention is a car-fender in combination with a shoe-brake for the car-wheel with intermediate mechanism by which the brake can be operated either by the motorman or automatically by the fender whenever the latter is swung inwardly by contact with a person or obstruction upon the track; and it consists of the combination of the several mechanical elements hereinafter particularly described, and set forth in the claims.

In the drawings, 1 is the floor of the car, and 2 2 are the joists on which the same are laid.

3 3 are the dash-boards, and 4 4 the wheels. At each end of the car are two hinges 5 5, by which the fender is hung. The fender consists of a frame 6, connected by a cross-rod 7. At the bottom of the frame 6 at the ends thereof are pivotally mounted at 8 the side bars or fender-arms 9, which are connected and supported at the forward ends by the cross-rod 10 and the stay-rod 11. Strips of canvas or other suitable material (shown at 12) pass over and between the cross-rods 7 and 10.

In Figs. 1 and 2 the fender is shown extended at the forward end of the car, and in Fig. 5 it is shown folded up against the dashboard at the rear end of the car.

The brake mechanism is practically the same as that shown and described in Letters Patent of the United States No. 556,949, issued March 24, 1896, to myself and Joseph Gilbert, and may be briefly described as follows:

Between the car-wheels 4 4 are placed two hangers 13 on each side of the car, and on proper supports (not shown) a cross-bar 14 is mounted so as to extend transversely from side to side of the car at the center thereof.

On the cross-bar 14 are mounted two slides 15, having a longitudinal slot, Fig. 4. On one end of each slide 15 are two extensions 16, united at their outer ends by a head 17. A buffer-rod 18 is mounted and longitudinally movable in said head 17, extensions 16, and slide 15, and is surrounded by the spiral spring 19. A downwardly-inclined bar 20 extends from the end of the slide 15, and at its end a shoe or chock-block 21 is pivotally mounted at 22. A friction-plate 23 is pivotally connected at 24 to the shoe or chock 21. A spring 25 extends between the chock-block 21 and friction-plate 23, being properly attached to each.

The slide, extensions, head, buffer rod and spring, shoe, and friction-plate should be of such dimensions and weight and so hung upon the central bar or pin 14 as to be practically balanced thereon.

On each hanger 13 a lever 26 is pivotally mounted at the center thereof, said lever being mounted at its lower end upon the pivot 22 of the chock-block 21. A latch-rod 27 is pivotally connected at its inner end to the top of the lever 26. The latch-rod 27 is supported by the hanger 28. At each end of the car a latch-holder 29 is fastened by bolts 30 to one of the central floor-joists 2 and is provided with a rectangular opening, (best shown in dotted lines in Fig. 1 and in section in Figs. 9 and 10,) through which opening the latch-rod 27 passes. The latch-rod is bent, as shown at 31, so that it may pass above the axles 32 of the car-wheels.

Near the outer end the latch-rod 27 is broadened transversely, as at 33, Figs. 9 and 10, and a stud-pin 34 passes through the rod 27 at that place, on which is a friction-roller 35. Still nearer the end of the rod 27 is the latch-lip 36, and the entire width of the rod and lip is such as to allow them freely to pass through the aperture in the latch-holder 29. A spiral spring 37 extends from the latch-rod 27, being attached thereto, as shown at 38, to the cross-bar 39.

Through a brace 40, having a tubular vertical extension and bolted to the floor or platform of the car, is a presser rod or bar 41, having a handle 42, and a spiral spring 43, surrounding the presser rod or bar 41, has its upper bearing against the handle 42 and its lower bearing against the tubular extension of the brace 40. On the edge of the presser-bar 41 is the wedge-shaped projection or cam 44 and also the projection or cam 45 at a right angle to the projection or cam 44, and made with its edge inclined at an angle, as shown in Figs. 6, 7, and 8.

At the ends of each side joist 2 is a large circular bore or chamber 46 and a small bore. Also at the end of the latter is the slot 47. A spindle 48 is mounted movably in the small bore, whose inner end extends into the slot 47 and whose outer end extends beyond the joist, as fully shown in Fig. 3. The spindle 48 has the head 49 and the fixed collar 50. A spiral spring 51 surrounds the spindle 46 and has its bearings against the collar 50 and the end of the chamber or bore 46.

A lever 52 is centrally pivoted at 53 on one of the joists 2, and has its inner end bent and curved, as shown in Fig. 3.

The operation of my combined car fender and brake is as follows: When the car is running, the fender at the forward end is lowered and that at the rear end is raised, as seen in Fig. 4. The shoes or chocks 21 are all raised and free from the track and wheels. Suppose now a person is upon the track in front of the advancing car and is struck by the forward end of the fender. He will fall into the apron formed by the strips 12, and will receive no harm. The fender, when so struck, will swing inwardly and its frame 6 will press the head 49 of the spindle 48 and move the spindle inwardly, compressing the spiral spring 51. This inward movement of the spindle 48 moves the lever 52 on its pivot or fulcrum 53, and the curved end of said lever thereupon presses inwardly the latch-rod 27, disengaging the latch-lip 36 of the rod 27 from the latch-holder 29. The rod 27 is now free to move and is drawn by the spiral spring 37 lengthwise and toward the front of the car. This longitudinal movement of the rod 27 operates the lever 26, which controls the brakes of the rear wheels. Said lever 26 so moved draws down the bar 20 and tips and unbalances the slide 15, which now moves on the central pin or bar 14 along the slot in said slide. This downward movement of the bar 20 brings the shoe 21 down to the track and under the wheel. The wheel rolling up on the inclined edge of the shoe forces down the friction-plate 23 upon the track, compressing the spring 25 and quickly stopping the car. As more fully shown and specified in said Letters Patent, the friction-plate is tempered and serrated on its under surface, so that it can have a strong frictional hold upon the track. The shock caused by the sudden stopping of the car is received first on the buffer-rod 18 and its strong spiral spring 19 which surrounds it.

To start the car again, it is only necessary to reverse the motive power and run the car back a few inches, whereupon the wheel is withdrawn from its pressure upon the shoe and the motorman then draws upward the bar 41, whose wedge-shaped extension 45 causes the roller 35 of the rod 27 to roll up along the inclined edge of the extension-piece 45 to the position shown in Fig. 6, thereby stretching the spring 37, while at the same time the extension 44 crowds the latch-rod 27 sidewise, so that its lip 36 engages with the latch-holder 29, as seen in Fig. 10. This return movement of the rod 27 carries the lever 26 from its vertical position to its inclined position, (see Fig. 4,) thereby raising the bar 20 and allowing the slide 15, by the expansion of the buffer-spring 19, to move back in its slot upon the central bar or pin 14 until the slide and its appurtenances are all in equipoise again. The spiral spring 51, surrounding the spindle 48 at each corner of the car, should be powerful enough to normally keep the fender in the extended position shown in Fig. 2. The brake mechanism can also be operated by the motorman independently when necessary. By depressing the bar 41 the extension-piece 44 on its side crowds the rod 27 outwardly, as illustrated in Fig. 9, thus throwing the latch-lip 36 of said rod out of engagement with the latch-holder 29, whereupon the spring 37 operates as before described and causes the shoes 21 and friction-plates 23 to chock the wheels. It is thus apparent that the brakes can be operated either by the motorman or automatically by the fender when the latter comes into forcible contact with an obstruction on the track.

When the presser-bar 41 and its extensions 44 and 45 are in the position shown in Fig. 7, the shoe and friction-plate are out of engagement with the wheel and track, as will appear by an examination of Fig. 4, and the spiral spring 37 on that end of the car is stretched.

A similar device either with or without the fender is applicable to steam-railroad cars for either passengers or freight.

I claim as a novel and useful invention and desire to secure by Letters Patent—

1. In a car, the combination of a car-wheel, a sliding bar adapted to be hung in equipoise upon a pin-support but movable thereon when unbalanced, a brake-shoe connected and movable with said slide, a longitudinally-movable latch-rod arranged to move said slide, a latch-holding device for said rod, a presser-bar mounted in and through the platform of the car and provided with cam-surfaces, one of which is capable of disengaging the latch-rod from the latch-holder and the other of which is capable of imparting longitudinal movement to said rod, and a spring adapted to give return movement to said rod, substantially as set forth.

2. In a car, the combination of a car-wheel, a sliding bar adapted to be hung in equipoise upon a pin-support but movable thereon when unbalanced, a brake-shoe connected and movable with said slide, a longitudinally-movable latch-rod arranged to move said slide, a latch-holding device for said rod, a pivotally-hung fender, a buffer-rod movable by the fender, a lever movable by the buffer-rod and adapted to disengage the latch-rod from the latch-holder, a presser-bar mounted in and through the platform of the car and provided with cam-surfaces, one of which is capable of disengaging the latch-rod from the latch-holder and the other of which is capable of imparting longitudinal movement to the latch-rod, and a spring adapted to give return movement to said latch-rod, substantially as specified.

ALBERT H. WHEELER.

Witnesses:
WARREN R. PERCE,
DANIEL W. FINK.